US010262129B1

(12) United States Patent
Gupta

(10) Patent No.: US 10,262,129 B1
(45) Date of Patent: Apr. 16, 2019

(54) DYNAMIC PASSWORD GENERATOR WITH FUZZY MATCHING

(71) Applicant: Shanit Gupta, Redwood City, CA (US)

(72) Inventor: Shanit Gupta, Redwood City, CA (US)

(*) Notice: Subject to any disclaimer, the term of this patent is extended or adjusted under 35 U.S.C. 154(b) by 126 days.

(21) Appl. No.: 15/294,784

(22) Filed: Oct. 16, 2016

Related U.S. Application Data

(60) Provisional application No. 62/249,390, filed on Nov. 2, 2015, provisional application No. 62/404,086, filed on Oct. 4, 2016.

(51) Int. Cl.
| | |
|---|---|
| *G06F 21/00* | (2013.01) |
| *G06F 21/46* | (2013.01) |
| *H04L 29/06* | (2006.01) |
| *G06F 16/338* | (2019.01) |
| *G06F 16/33* | (2019.01) |

(52) U.S. Cl.
CPC ............ *G06F 21/46* (2013.01); *G06F 16/338* (2019.01); *G06F 16/3344* (2019.01); *H04L 63/083* (2013.01); *H04L 63/0823* (2013.01)

(58) Field of Classification Search
CPC ................. G06F 17/21; G06F 17/2881; G06F 17/30684; G06F 17/30696; G06F 21/83; G06F 21/32; H04L 63/083; H04L 63/0823
USPC .......................................................... 726/6
See application file for complete search history.

(56) References Cited

U.S. PATENT DOCUMENTS

| | | | | |
|---|---|---|---|---|
| 8,667,296 B1* | 3/2014 | Bilinski | ................. | G06F 21/46 713/184 |
| 2006/0253702 A1* | 11/2006 | Lowell | .................... | G06F 21/33 713/156 |
| 2007/0245149 A1* | 10/2007 | Lin | ....................... | H04L 9/0662 713/184 |
| 2008/0215541 A1* | 9/2008 | Li | ........................ | G06F 17/3064 |
| 2009/0076927 A1* | 3/2009 | Sridhar | ............. | G06F 17/30696 705/26.1 |
| 2011/0025516 A1* | 2/2011 | Johnson | .............. | G06F 17/2705 340/657 |
| 2013/0144888 A1* | 6/2013 | Faith | ................. | G06F 17/30696 707/748 |
| 2013/0198824 A1* | 8/2013 | Hitchcock | ............... | G06F 21/00 726/6 |
| 2013/0263233 A1* | 10/2013 | Dinha | ................... | H04W 12/06 726/5 |
| 2015/0067760 A1* | 3/2015 | Waltermann | ........ | G06F 21/6218 726/1 |
| 2015/0121489 A1* | 4/2015 | Yang | ...................... | G06F 21/36 726/6 |

(Continued)

*Primary Examiner* — Kendall Dolly
*Assistant Examiner* — Kevin Ayala
(74) *Attorney, Agent, or Firm* — CipherLaw

(57) ABSTRACT

A method for aiding a user in recalling and generating a password. Many times it is easier for a user to remember a place, phrase, person, or other piece of information based on a certain context. The present invention allows for generating a password based on contextual information provided by the user. By providing a context type and a pass phrase, a secure password can be generated. The invention also provides a mechanism for "fuzzy matching", in which a user only needs to provide a password that is close enough to a stored password to gain access to a website or service. The context type and pass phrase can be used to create a list of passwords (the list being limited to a certain number of entries), each matched against a database of passwords to validate entry.

20 Claims, 13 Drawing Sheets

(56) References Cited

U.S. PATENT DOCUMENTS

| | | | |
|---|---|---|---|
| 2015/0270965 A1* | 9/2015 | Fischer | H04L 9/0869 380/28 |
| 2016/0078217 A1* | 3/2016 | Das | G06F 21/36 726/18 |
| 2017/0041330 A1* | 2/2017 | Hunt | H04L 63/1416 |

* cited by examiner

This is final trim.
In password gen, these are the factors. Length (set by the account service), Complexity (must start with alphabet letter).

DYNAMIC PASSWORD GENERATOR WITH FUZZY MATCHING

CROSS-REFERENCE TO RELATED APPLICATIONS

This application claims the benefit of U.S. Provisional Application No. 62/249,390, filed 2 Nov. 2015, and U.S. Provisional Application No. 62/404,086, filed 4 Oct. 2016, the contents of which are herein incorporated by reference in their entirety.

FIELD OF THE INVENTION

The present invention relates generally to providing a contextual mechanism for generating secure passwords. More specifically, the invention relates to a method for fuzzy matching of contextually generated passwords based on assumed risk levels.

BACKGROUND OF THE INVENTION

Many websites, systems and services require users to send login information to gain access. For example, a website may require a specific combination of a username and a password. The combination of username and password is used to validate that a user may have sufficient privileges to access information resources provided, such as a web page, movie, database, files, etc.

Many such websites require secure passwords. Some examples of secure passwords require users to have specific combinations of alphanumeric characters and special characters, as well as have a minimum length. The problem with requiring this level of security is that it makes the password extremely difficult to remember.

Another aspect of modern web site security policy is that many websites limit the number of attempts certain combinations of usernames and passwords can be tried. If it is difficult for a user to remember the password, the user may end up being locked out of the website, requiring additional steps to reactivate the account.

BRIEF DESCRIPTION OF THE DRAWINGS

The invention will now be described, by way of example, with reference to the accompanying drawings, where like numerals denote like elements and in which.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Most people don't have problems remembering pieces of information when there is context associated with them. For example, it is easy for someone to remember where their favorite hometown restaurant is, the name of their favorite book, their loved one's favorite song, or their favorite scientist. This contextual information is also easily kept as a secret. The present invention can include a system for enabling persons to generate passwords based on contextual information and a mechanism to allow a fuzzy matching of passwords to validate a user login.

Password Generator

Figure 1:
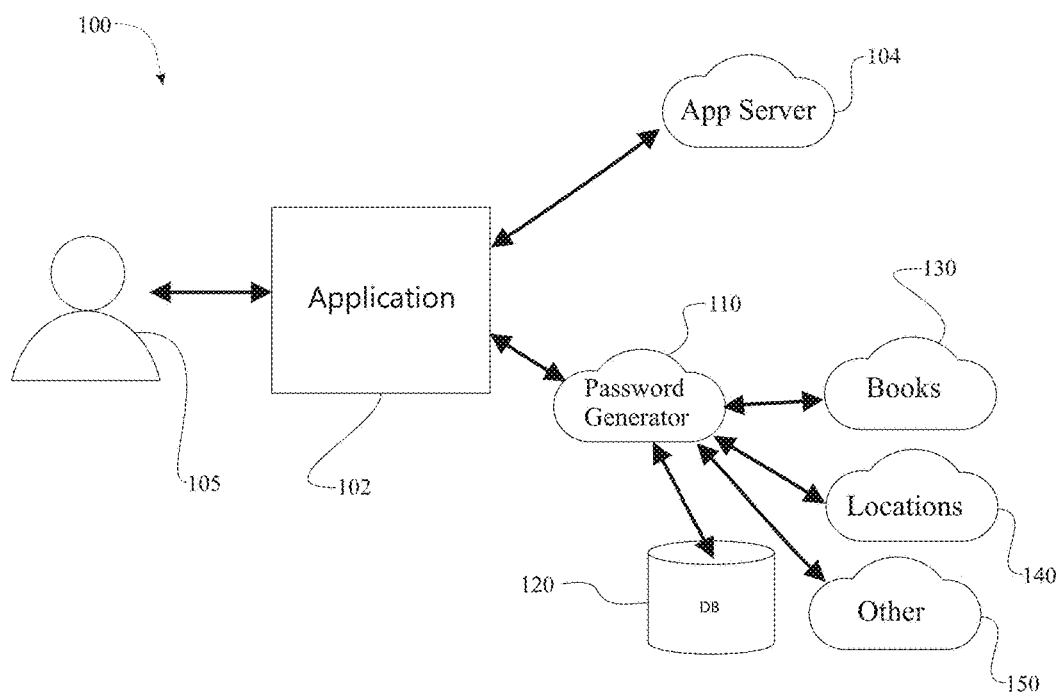
FIG. 1 illustrates an example of a contextual password generator.

FIG. 1 illustrates an example of a password generation system 100. The password generation system 100 depicts a user 105 interacting with an application 102. In some embodiments, the application 102 may be a web browser, such as Google's Chrome Browser, Mozilla's Firefox, Apple's Safari, Opera, or any other application which is able to retrieve, present, and traverse information resources on a network (local, office, home or Internet). In other embodiments, the application 102 may be any process configured to provide authentication services either by establishing a new user password or verifying an existing user password. The application 102 may be in communication with an application server 104. Here, application server 104 may refer to an information resource provider (e.g. a webserver), an operating system login (e.g. Windows, Linux, OSX, etc.), a database, or any other system that may require a login. The application server 104 provides information resources to the application 102, such as web pages, images, video, or other pieces of content. The user 105 is able to interact with the application 102 in order to request various information resources from the application server 104 based on input to the application 102. The application server 104 may be configured to limit access to information resources by requiring the user 105 to provide login information before transmitting the information resources to the application 102. For exemplary purposes, a login may constitute a specific combination of a username and a password.

To aid the user 105 in generating and/or recalling a password or passphrase, the application 102 interacts with a password generator 110. As a non-limiting example, the password generator 110 may be implemented as a browser extension when the application 102 is a web browser. Alternatively, the password generator 110 may be a separate application that is able to independently provide the user 105 with a transformed password. As a browser extension, the password generator 110 is able to recognize when the user 105 is typing in a password. Information conveyed by the application 102 to the user 105 may be designated as a password field. For exemplary purposes, such information may be a password field, which is an "input" element in an HTML "form," such input element having a "type" which is designated as "password." The password field may also have designated events associated with certain actions. For example, an "on change" event may indicate that a value stored in the password field has changed, an "on focus" event may indicate that the user 105 has engaged the field for typing, and an "on submit" event mat indicate that the user has submitted the value in the password field. Either of the "on focus", "on change", or "on submit" events for the password field may be provided to the password generator 110 by the application 102 to indicate that user has begun typing a password, the value the user 105 has provided has recently changed, or the value has been submitted, respectively.

The password generator 110 aids the user 105 in generating and recalling a password by converting a contextual phrase into a password. The user 105 enters a password generation phrase into the password field, designating a context type by typing the context type as the first word in the password generation phrase. For exemplary purposes, the context type may be any one of "book", "movie", "location", "music", and "color", though other context types are contemplated. As non-limiting examples, other context types could be "historical event", "favorite scientist", "favorite artist", "quotation", or "equation." In some embodiments, the context type can be selected by typing, while in other embodiments the context type can be selected from a menu of options. As an example, a user 105 desiring to create a password of the "book" context type with a title of "The Great Gatsby" would enter "book the great gatsby" as the password generation phrase. In yet another embodiment, the context type may be inferred without the user 105 specifically designating the context type. For example, if the user 105 enters "Hitchhiker's guide", the password generator 110 may determine that the context type is book. The password generator 110 may determine the context type by performing a query of the phrase entered by the user 105 on a search engine, database, or any combination of query resources, such that a context type is returned. The password generation phrase may be sent to the password generator 110 whenever an application event is detected by the application 102. For exemplary purposes, the application event may be any of an "on focus", an "on change", or an "on submit", though any other event type may be used (e.g. "on blur", "on click", "on mouse over" "on mouse out", "on load", "on key down", "on mouse double click", "on mouse enter", "on keypress", "on input", etc.).

When the value of the password field has been received by the password generator 110, the password generator 110 first parses a first word from the password generation phrase to recover the context type, leaving a passphrase. If there is no information conveyed (e.g. the first "on focus" event to occur with a blank password field), the password generator 110 may send a list of available context types to the application 102 to display to the user 105. If a valid context type is found, the password generator 110 then selects a specific query resource based on the context type to perform a query, where each context type is associated with a specific query resource. For exemplary purposes, query resources may be a database 120, a book query resource 130, a location query resource 140, or another query resource 150, though the use of any other arbitrary query resource is contemplated.

Though depicted as separate elements in FIG. 1, the books query resource 130, locations query resource 140, database 120, and other query resource 150 may each reside on a single computer as a database or exist as separate components distributed over a network and accessible as an Application Programming Interface (API). Once the appropriate query resource is selected, the passphrase is sent as the subject of the query. For example, if the user 105 typed "book the great gatsby" into the password generator 110, the book query resource 130 would be chosen to perform the query and the subject of the query would be "the great gatsby". Once the appropriate query resource is queried, the password generator 110 returns the top n results to the application 102, where n is a definable integer which indicates the desired number of query returns to display to the user 105. In an alternate embodiment, the passphrase may be sent as the subject of a query to all query resources available. The password generator 110 may then determine those query resources that have the highest number of results. For example, if the user 105 input "Harry Potter", the query resources with the highest number of results may be the books query resource 130 and a movies query resource (not depicted). The password generator 110 may then return the top n results from each of the query resources with the highest number of results along with the context type of each to the application 102 (e.g. "Book Harry Potter . . . " and "Movie Harry Potter . . . ").

The password generator 110 may dynamically interact with the user 105 via the application 102. One such method may use the technique of Asynchronous JavaScript and XML (AJAX). As the user 105 continues to type in the password generation phrase, the password generator 110 will continue to return the top n results obtained from the query resource to the application 102 and display them to the user 105. At any point, the user 105 may select one of the top results displayed, for instance by clicking on it. The selected result is then retrieved by the password generator 110 in order to transform the selected result into a password.

As before, the selected result is parsed into a context type and a passphrase. Alternatively, the selected result may not include the context type, in which case parsing is not necessary. After the context type and passphrase have been parsed by the password generator 110, the password generator 110 is able to transform the passphrase into a password. One example method of transforming the passphrase into a password is shown in the following transformation process.

Transformation Process

Capitalize the first letter of the passphrase;

Create a set of alternate characters (e.g. {, !, @, #, $, %}), assigning to each a numerical representation (e.g. {(1, !), (2, @), (3, #), (4, $), (5, %)}, such that each numerical representation corresponds to a unique character;

Determine a modulus of the number of total characters in the passphrase by the number of characters in the set of alternate characters;

Select a replacement character as the character in the alternate set having a numerical representation equal to the modulus;

Replace all whitespace in the passphrase with the replacement character;

Append the modulus to the end of the passphrase; and

Return the transformed passphrase as the password.

Although the above steps describe one method of transforming a passphrase into a password, it is contemplated that various other methods could be used. For example, capitalization in step 1 could be performed on other characters in the passphrase and step 6 of appending the modulus may be optional. Further examples include incorporating a referrer URL, username, salt, or metadata provided in a header of the information resource provided into the password. Other transformation steps contemplated include modulus operations, character shifting, hashing, password based key derivation, character replacement, and the use of keys. To further enhance security, the user 105 may be able to designate a "seed." The seed may be any piece of information designated by the user 105, such as an email address. The seed may be prepended to or appended to the passphrase before performing the transformation steps. Alternatively, the seed may be used to determine certain logic steps (e.g. based on a length of the seed perform a modulus operation).

After the password generator 110 creates the password from the selected result, the password is then provided to the application 102. The password, along with any additional information, such as username, may be transmitted to the application server 104 as login information either in connection with a password generation process or to verify that the user 105 has access to additional information provided by the application server 104. If the user 105 had not previously created login information for the application server 104, the password generated by the password generator 110 may be stored on the application server 104 for future login purposes.

Figure 2:
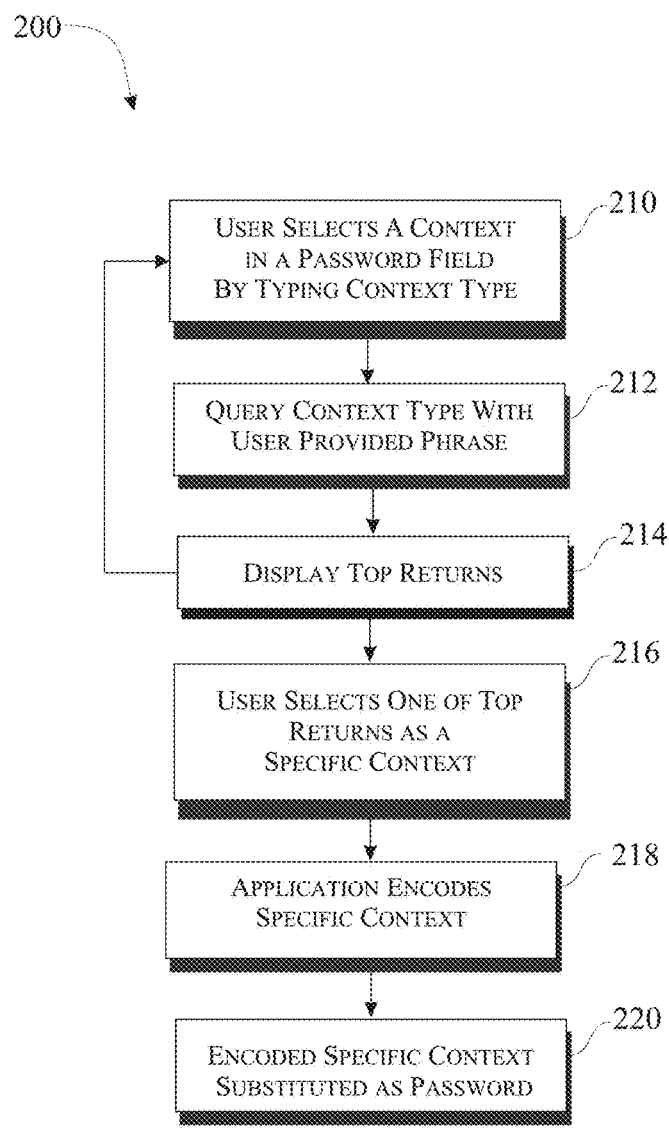
FIG. 2 illustrates an example flow diagram of contextual password generation.

A password generator flow is depicted in FIG. 2. Starting in a context selection step 210, a user inputs a password generation phrase into a password field as displayed by an application. On any application event registered by an application, the password generation phrase is sent to a password generator.

In a query step 212, the password generator receives the password generation phrase and parses it to create a context type and a passphrase. The context type is then compared to a list of all possible context types stored in the password generator. If the context type does not match any of the context types in the list, list of all possible options are sent back to the application to display to the user. If a context type does match one of the context types in the list, a corresponding query resource is chosen. The passphrase is sent as a query subject to the query resource. The query resource then returns a list of results of the query. A definable number of the query results may be selected (e.g. the first n, where n may be defined to be any non-negative integer) and returned to the application as a list of top returns. Alternatively, if a context type is not provided the password generator may determine a context type and return at least one context type and associated query results to the application.

In an optional display step 214, the list of top returns is displayed to the user. If the user continues typing (or otherwise triggers an application event), the password generator flow 200 will return to the context selection step 210. Otherwise, the password generator flow 200 will continue to the selection step 216.

In a selection step 216, the user specifies a selected result. If the display step 214 is performed, the selected result is chosen when the user performs some action on the displayed top returns. An example of such an action is the user clicking on the desired query result. If the display step 214 is not performed, the selected result is the password generation phrase received by the password generator in the query step 212. Optionally, the performance of the selection step 216 may be restricted to only "on submit" events.

In an encoding step 218, the password generator transforms the selected result into a password. The selected result is parsed into a context type and a passphrase. After the context type and passphrase have been parsed by the password generator, the password generator is able to transform the passphrase into a password (for example using the transformation process above).

In a substitution step 220, the password, as generated by the password generator, is returned to the application. Here, the generated password may be used as the password for login credentials when attempting to access information resources that require a login.

Figure 3A:
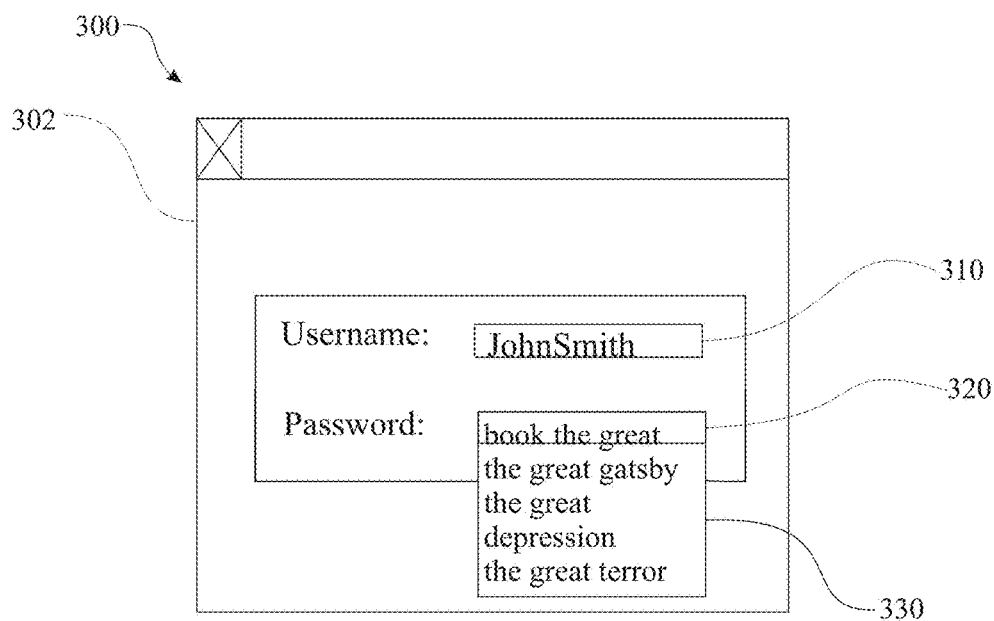
FIG. 3A illustrates an example of a graphical user interface (GUI) during the contextual password generation.
Figure 3B:
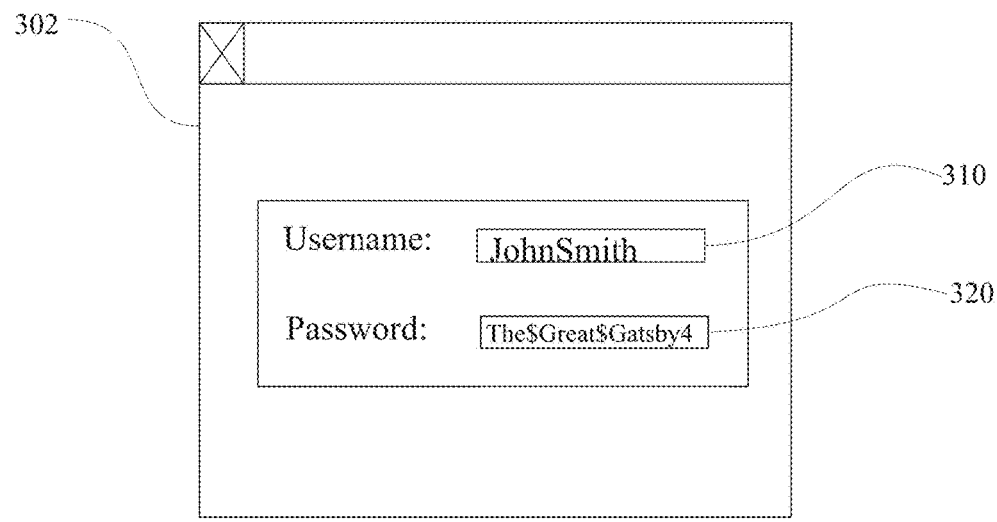
FIG. 3B illustrates an example of the GUI after contextual password generation has generated a contextual password.

FIG. 3A and FIG. 3B illustrate how a user may be provided with context assistance in a graphical user interface (GUI) 300. In both FIG. 3A and FIG. 3B, an application server interacts with a user via an application 302. The application 302 may prompt the user for login information by requesting a username in a user input field 310 and a password in a password field 320. When any event is detected by the application, the data entered in the password field 320, representing a password generation phrase, is sent to a password generator. The password generator parses the password generation phrase into a context type and a passphrase. As shown in FIG. 3A, the password generation phrase is displayed in the password field 320 as "book the great gatsby," indicating a context type "book" and a passphrase "the great gatsby."

FIG. 3B depicts the dynamic aspect of the invention. In order to aid a user in selecting the correct contextual passphrase (password generation phrase), a context help display 330 is displayed. The context help display 330 provides the user with a list of the top results of a query to a query resource based on the password generation phrase.

Fuzzy Matching

Figure 4:
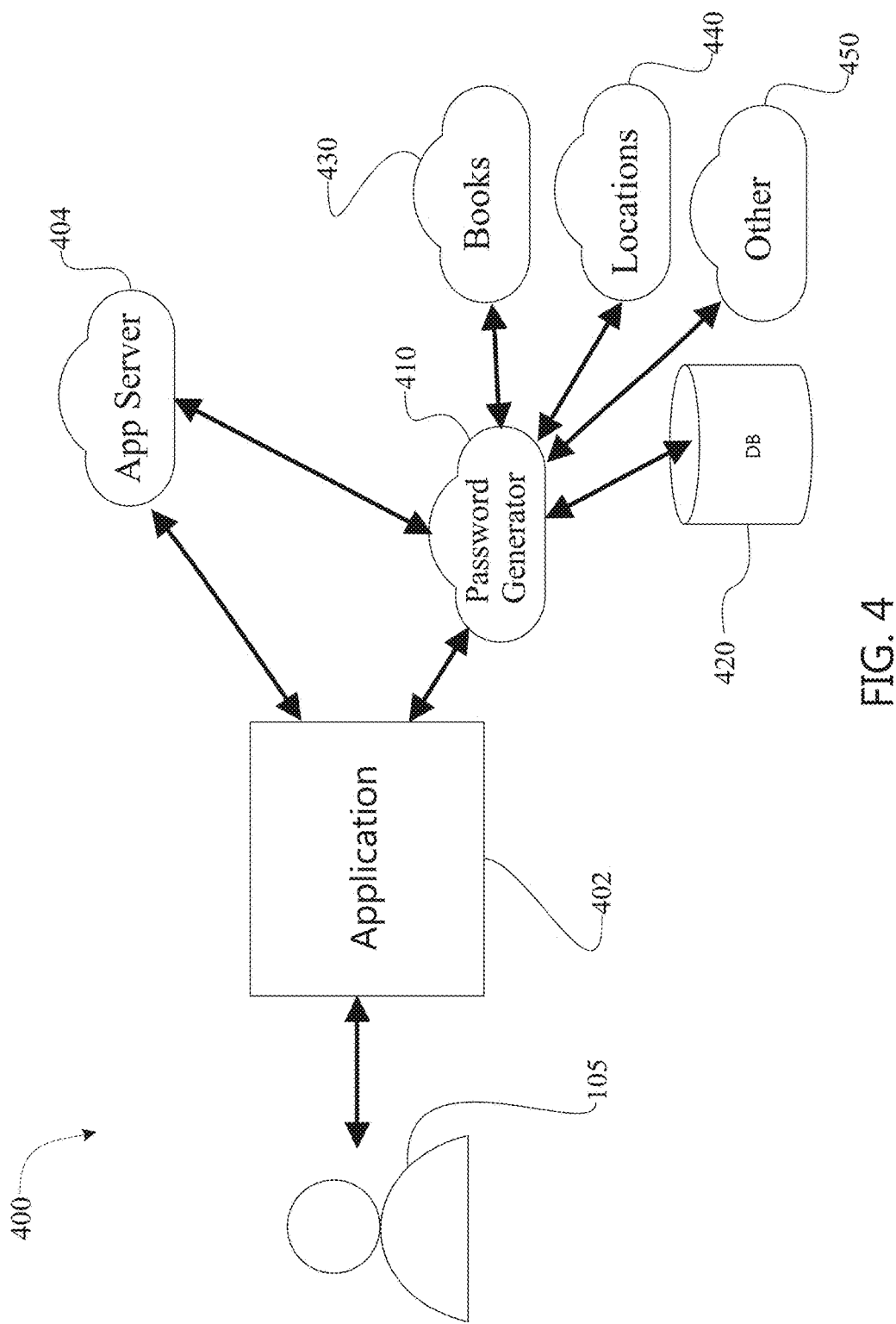
FIG. 4 illustrates an example of an alternate embodiment of the present invention.

A further embodiment is depicted in FIG. 4 as a fuzzy matching system 400. FIG. 4 depicts a user 105 interacting with an application 402. Similar to the example depicted in FIG. 1, the fuzzy matching system 400 may aid the user 105 in recalling a password for an application server 404 through the use of a password generator 410. The password generator 410 may be collocated with the application server 404 to prevent the user 105 from tampering, reverse engineering, or otherwise modifying any accessible source code of the password generator 410, thereby increasing security of the application server 404.

Additionally, when the application 402 first requests information resources from the application server 404, the application 402 or the password generator 410 may first determine a risk level associated with the user 105. For example, the risk level may be "low", "medium", or "high", though any number of designations may be defined. Each risk level designation may be determined by a number of factors. Some examples of factors used to determine risk level include, but are not limited to, cookies (e.g. information stored in the application 402), multiple logins from the same location, the user 105 is requesting the information resource from a trusted device, the user has completed a two-factor authentication, the user 105 is associated with a known IP address, the user 105 is at specific geolocation, and the user 105 has some piece of data (e.g. a file or key) stored in a local database.

Depending on the risk level, the application 402 may convey additional information to the user 105 to aid in password recall. For example, if the risk level is determined to be "low", the application 402 may display to the user 105 a context type. On the other hand, if the risk level is determined to be "high", the application 402 may not display any additional information to the user 105. Further, the application server 404 may also require additional criteria based on the risk level determined. For example, the application server 404 may require that the password have a minimum number of characters, a minimum number of words, or require some combination of characters.

In order to enhance security, the application server 404 may optionally set a threshold. The password generator 410 compares the number of results obtained by the query resource with the threshold provided by application server 404. If the number of results is greater than the threshold, an error message is displayed to the user 105 indicating that there was not enough context provided. Depending on the risk level, various alternatives actions may be presented to the user 105. For example, if the risk level is "low", the application 402 may display additional context as hints to the user 105. If the risk level is "high", however, the application 402 may not allow the user 105 to make additional attempts. The application 402 may also display the error and allow the user 105 to reenter the password generation phrase. The threshold may be different for each risk level set by the application server 404. For exemplary purposes, a bank may require that the threshold number is 1 for every risk level. In an alternative example, another application server may designate a threshold of 10 for "low" risk levels, a threshold of 5 for "medium" risk levels, and a threshold of 1 for "high" risk levels.

Unlike the example illustrated in FIG. 1, the dynamic interaction may be optional. For example, if the risk level determined by the password generator 410 is "high", the password generator 410 may not dynamically present new query results to the user 105.

Additionally, the application server 404 may assign a "fuzziness number", NF, to the password generator 410. The "fuzziness number" is used to create a subset of the list of returns from the query resource. The subset is created by incorporating only NF results in the list of results, where NF is a positive integer provided by the application server 404. The results may be selected, for example, as the first NF items in the list of results. Alternatively, the list of results may first be sorted by some parameter (e.g. length, geographic proximity for "location" context types, etc.) and then the first NF items in the sorted list may be selected as the subset. Once the subset is created, each result in the subset is transformed, creating a list of transformed passwords (for example, by using the transformation process above).

Optionally, each of the transformed passwords may be appended or prepended with a salt (e.g. a random sequence of data), yielding a salted transform, and then subsequently hashed (for example using SHA256, MD5, or any other hashing technique) creating a salted and hashed phrase. Each salted and hashed phrase may be compared to stored login credentials in the database 420. The database 420 may be stored locally with the password generator 410. If any one of the salted and hashed passwords, combined with any other login credential information required, matches that of login passwords in the database 420 of the password generator 410, a success message may be returned. In addition to the success message, the password field in the application 402 is substituted with the matching result, to be submitted to the application server 404. Optionally, the salted and hashed passwords may be sent by the password generator 410 directly to the application server 404 to verify the login credentials, such that the database of salted and hashed passwords does not need to be stored locally with the password generator 410.

Figure 5:
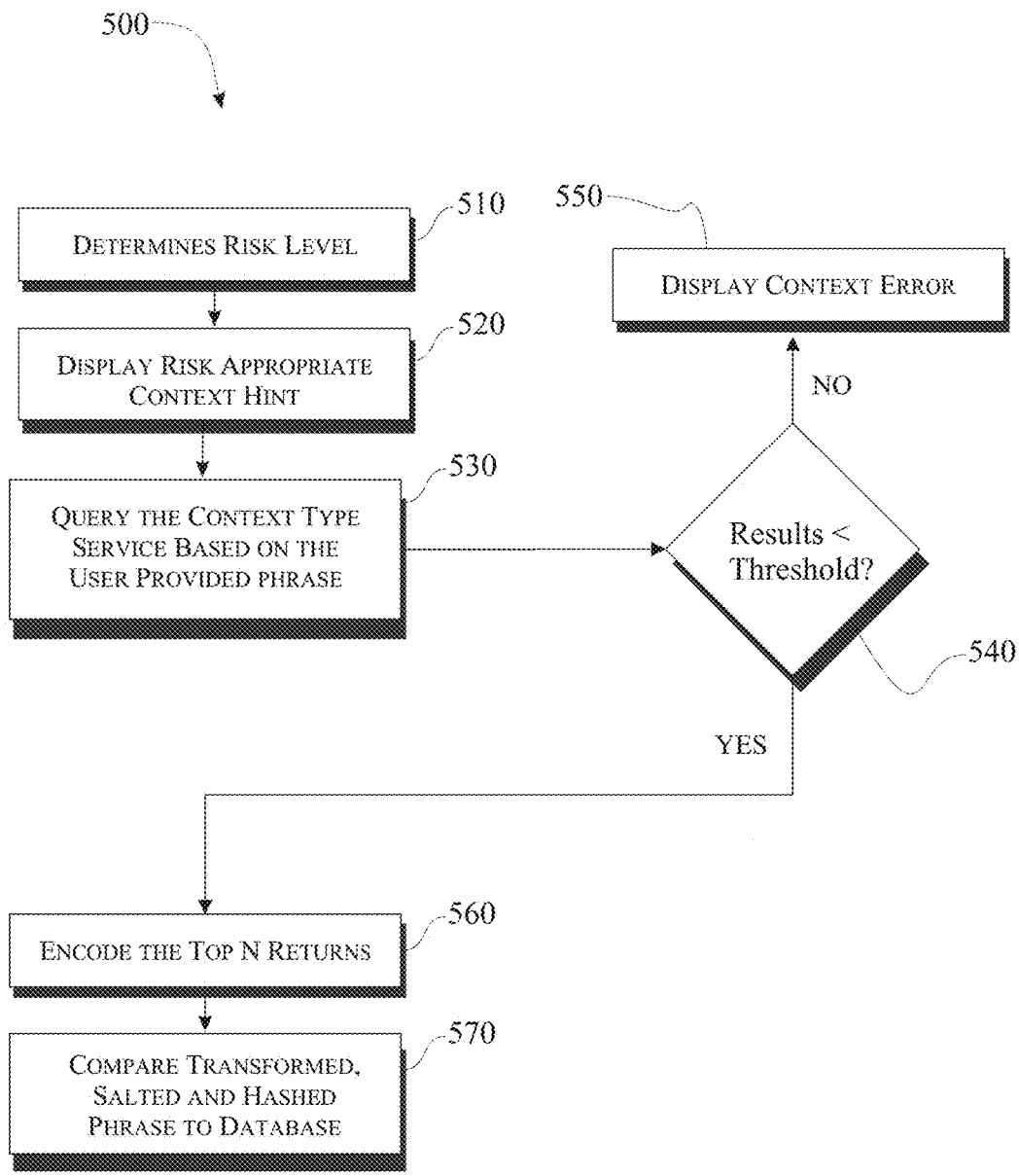
FIG. 5 illustrates an example flow diagram for fuzzy matching.

FIG. 5 depicts an example of a fuzzy matching flow 500. In a risk determining step 510 of the fuzzy matching flow 500, a risk level is determined. An application server may be configured to designate several different categories of risk designated by a number of risk factors. The application or the password generator is able to determine a risk level based on the risk factors. Based on the risk level, a context hint is displayed to the user in a context hint step 520.

In a query step 530, a password generation phrase is input by the user into the password field. Certain criteria may be required based on the risk level determined. For example, the application server may require a minimum number of characters, certain combinations of characters, or a minimum number of words, which may differ for every risk level. If the criteria are not met, the user may be prompted to fulfill the criteria before continuing. Once the criteria are met, the password generation phrase is sent to the password generator. The passphrase is then sent to the specific query resource and a query is performed, wherein the subject of the query is the passphrase. The specific query resource returns a list of results.

In a comparison step 540, the number results in the list of results is compared to some threshold level set by the application server. The threshold level may be different for each risk level. If the number of results is less than the threshold, fuzzy matching flow 500 proceeds to an error step 550. Otherwise fuzzy matching flow 500 proceeds to an encoding step 560. For exemplary purposes, a bank may require that the threshold number is 1 for every risk level. This means that if the number of elements in the list of results returned from the specific query resource is greater than 1, the fuzzy matching flow 500 would proceed to the error step 550. In an alternative example, another application server may designate a threshold of 10 for "low" risk levels, a threshold of 5 for "medium" risk levels, and a threshold of 1 for "high" risk levels. In the alternative example, if a user interacting with an application is determined to have a "low" risk level, and the number of results in the list of results is less than 10, the fuzzy matching flow 500 would proceed to an encoding step 560.

Though not depicted, it is contemplated that the fuzzy matching flow 500 may proceed to one of several subsequent steps if the error step 550 is reached. In one instance, the fuzzy matching flow 500 may return to the context hint step 520. Alternatively, in order to increase the amount of security, the error step 550 may preclude the user making additional attempts by not returning to the context hint step 520. In a further example, if the risk level is "low", the password generator may send some indication to the application to display additional context hints.

Once the fuzzy matching flow 500 reaches the encoding step 560, a subset of the list of results is generated. The subset is created by incorporating only N results in the list of results, where N is a positive integer indicated by the application server. Each result in the subset is transformed, creating a list of transformed passwords (for example, using the transformation process above).

Optionally, each of the transformed passwords may be appended or prepended with a salt (e.g. a random piece of data), yielding a salted transform, and then subsequently hashed (for example using SHA256, MD5, or any other hashing technique) creating a salted and hashed phrase.

In a database step 570, each salted and hashed phrase may be compared to a database storing the login credentials for each user. If any one of the salted and hashed passwords, combined with any other login credential information, matches that of login passwords in the database of the password generator, a success message may be returned. In addition to the success message, the password field in the application is substituted with the matching result from the database query to be submitted to the application server. Optionally, the salted and hashed passwords may be sent by the password generator directly to the application server to verify the login credentials, such that the database of salted and hashed passwords does not need to be stored locally with the password generator.

Circle of Trust Implementation

A Circle of Trust (CoT) can include all email addresses, phone numbers and devices that a user owns and trusts. As an example, the personal email address and phone number of a user can be part of the CoT of the user. If a user wants to add any arbitrary phone number to the CoT of the user, that is the decision of the user. The CoT is a part of secondary factors that are used to generate a unique password. Each CoT has a CoT Key and Salt that remain constant for all Verification Channels and Devices that are part of the CoT.

Verification Channels

Each email address or phone number constitutes as a Verification Channel (VC). Each VC is part of a CoT. If the VC used by the user is not part of any existing CoT, then the system creates a new CoT for that VC. The main purpose of a VC is to allow a user to add multiple devices to the CoT. The VC serves as a medium through which the system can verify and add devices (e.g., laptop, tablets, phone, car, music players or any internet connected device) to the CoT.

Device

A device is referred to as any Internet connected electronic system. Non-limiting examples of devices are a laptop, tablet, phone, TV, car entertainment system, music player, etc. The device often needs to establish an authenticated connection with a service provider, for example, the laptop connecting to a banking site, or a TV connecting to a content streaming site. In any of these cases, the service provider often needs to determine the authenticity of the connection and associate it with an account. Usernames and passwords are a commonly used mechanism to establish this authenticity of the end user. The system described herein can be used to provide some of all of this authentication information.

Steps to Add a Verification Channel to CoT

First Time Use

If the user does not have a CoT, then the user is considered as a first time user. In this case, the user will enter an email address or phone number (Verification Channel) that is not already registered in the system. Once the user enters the VC, an email token is sent to that VC. The user can accept or reject the request to verify that Verification Channel. If the user does decide to confirm the verification request, the CoT is created and the VC is added to the CoT. Further, the device that initiated the actions will also be added to the CoT created for the user.

Add Verification Channel

Once a CoT is created, the user will have the ability to add additional VC. These can be additional email addresses or phone numbers that the user trusts and uses. This will allow the user the flexibility to add or remove additional devices as long the user has access to any of the VCs that are part of CoT. The steps to add a new VC to existing CoT remain the same as above. The user enters information such as the email address or phone number from a device that is part of the CoT. A confirmation code is then sent to the user and, if the user confirms the verification code, the new VC will be added to the CoT. If an attempt is made to add a new VC to CoT, existing and verified VCs can be notified of that attempt. The existing VCs will also be provided an ability to block that attempt from succeeding if it is an unauthorized attempt.

Remove Verification Channel

If for any reason, the user decides to remove a VC from the CoT, that can be done from a trusted device. The system application on a verified device can list all the VCs associated with the CoT of which the device is part. The user can decide to remove any VC.

Steps to Add a Device to a CoT

Figure 7:
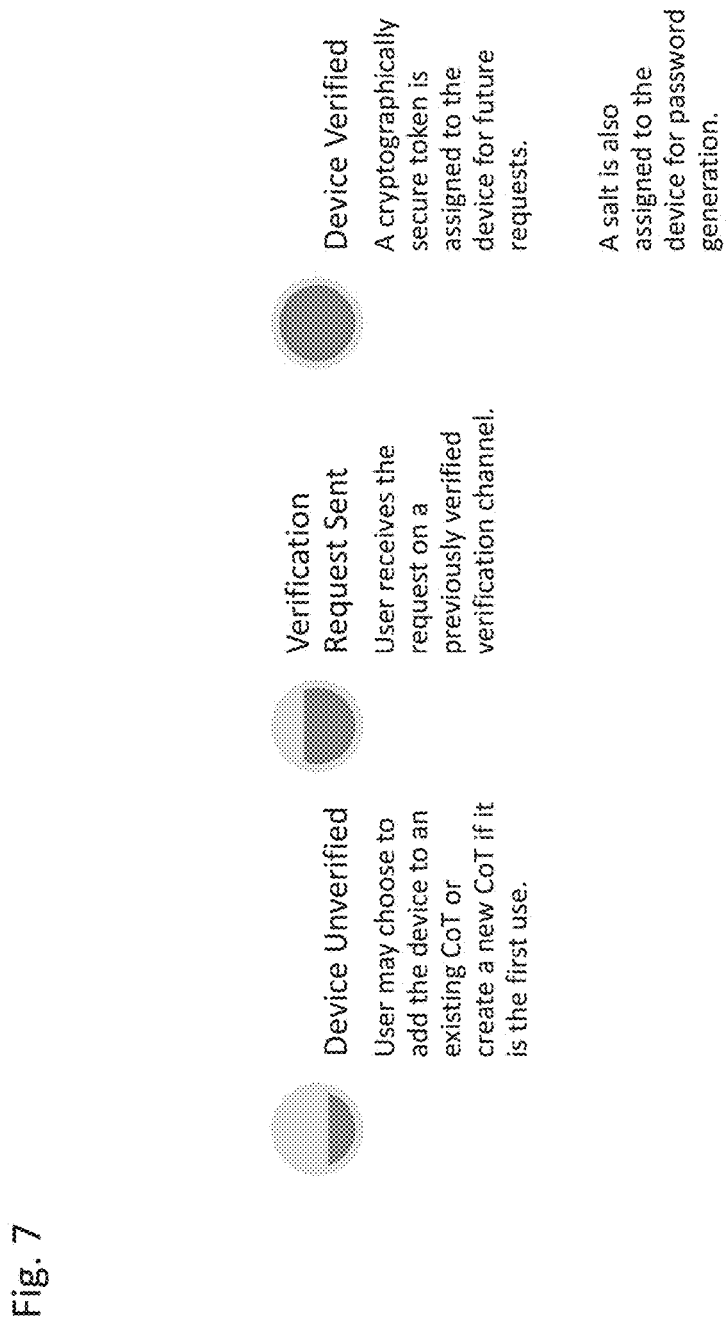
FIG. 7 illustrates example overview of steps for adding a device to a Circle of Trust.
Figure 8:
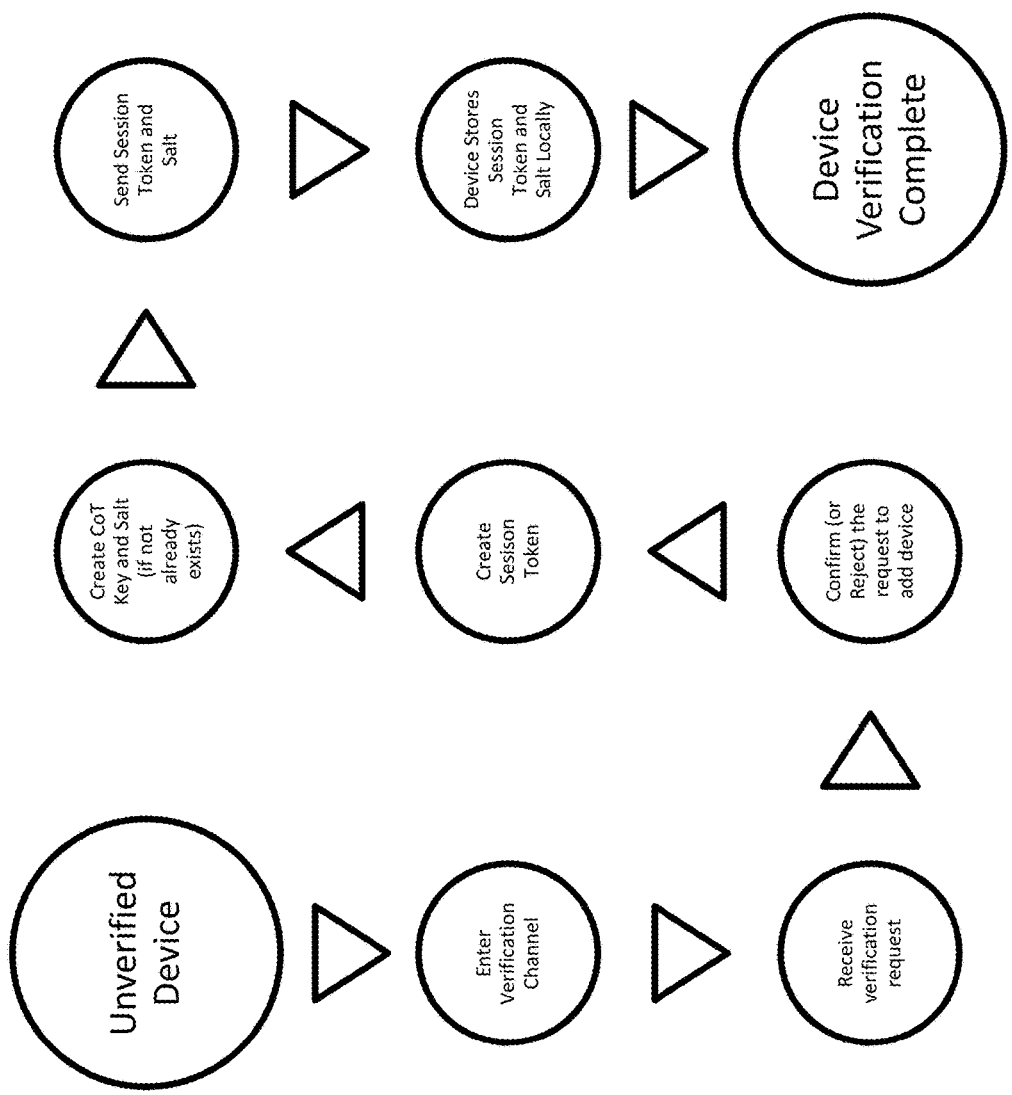
FIG. 8 illustrates example steps for device verification for adding a device to a Circle of Trust.
Figure 9:
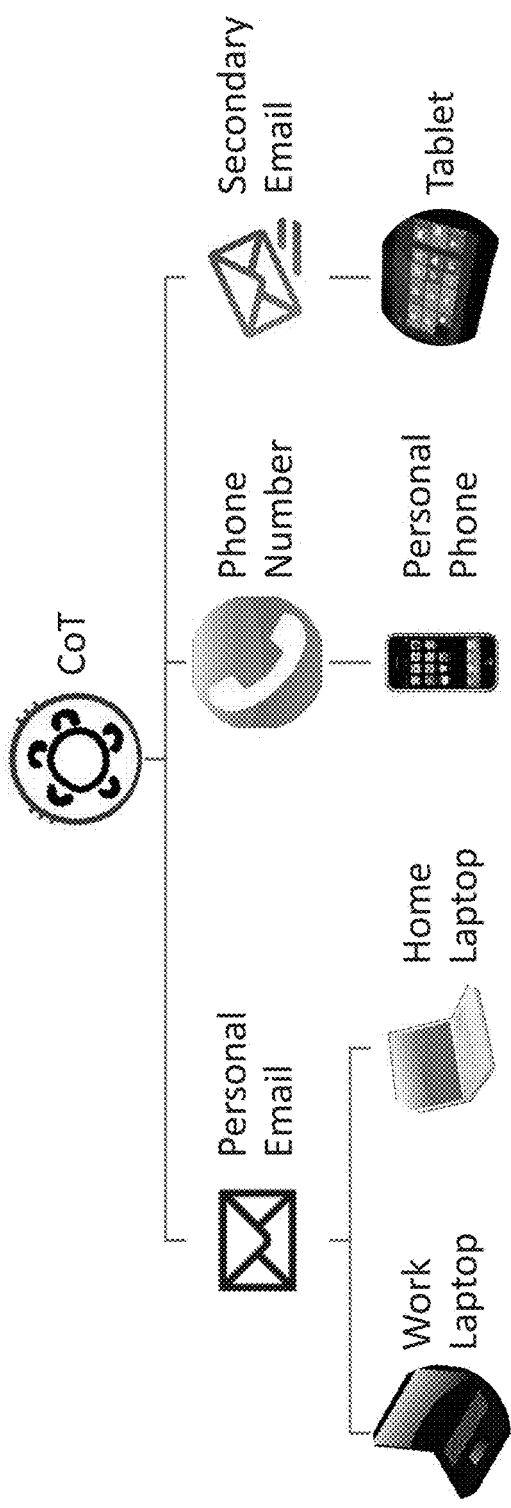
FIG. 9 illustrates an example relationship between Circle of Trust and Verification Channel.

In embodiments using a CoT, a device can be made part of a CoT. With reference to FIGS. 7 and 8, the steps below describe device verification and how a device can be made part of the CoT.

1. The system can add a device to a CoT and generate a password for the end user to authenticate to the service.

2. To add a device to CoT, the system application first determines if the user already has an existing CoT.

3. If the user has an existing CoT, the user can enter one of the multiple VC values associated with the CoT of the user.

4. The system backend services receives the verification request.

5. The system backend sends a verification code to the VC provided by the end user.

6. If the user confirms the request to add the request to CoT, the device is added to CoT.

7. The system generates a cryptographically secure token and sends it to the device along with CoT salt.

8. A cryptographically secure token and salt is stored on the device to identify the device and CoT for subsequent password generation requests.

Password Generation Process Using Referrer Header

Figure 10:
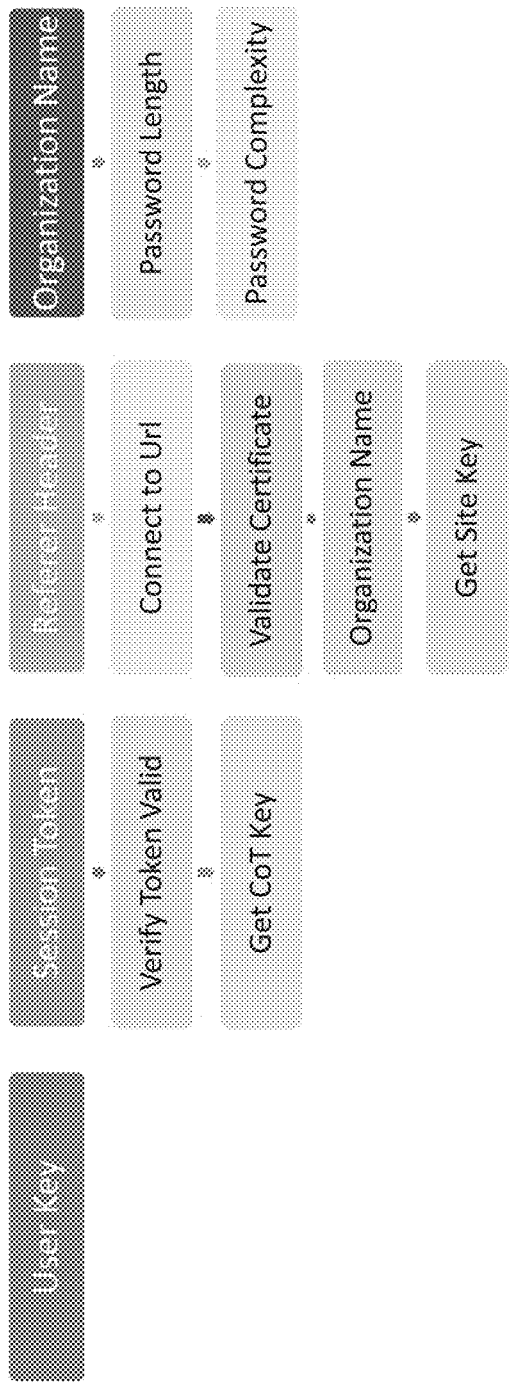
FIG. 10 illustrates example steps for password generation using a referrer header.

The password generation using a referrer is described below and illustrated in FIG. 10.

Step 1: The user selects a "secret" using the system application.

Step 2: The secret is converted to a "User Key" using a strong Key Derivation Function. The Salt that is placed on the device is used for Key Derivation. This makes it very hard to precompute the User Key.

Step 3: The User Key (from step 2) with the stored Session Token are sent to the system backend. The Referrer Header identifies the website for which that the user is trying to generate the password.

Step 4: The system backend receives the password generation request. Using the URL in Referrer Header, the system makes an SSL/TLS connection to the URL. The certificate provided by the site is used to determine the name of Organization. Based on the Organization Name, the system generates a unique Site Key for that organization. If the Site Key exists for current CoT, then existing Site Key is reused. If the certificate cannot be verified, is invalid, or expired, the password generation process fails. If the certificate is valid, but there is no Site Key associated with the CoT, then a new Site Key is generated for the Organization Name and associated with the CoT of the user. In a variation of this scenario, it is possible to have a different Site Key for certain subdomains or specific URLs. This will allow the user to generate different passwords although the Organization Name is the same for different URLs.

Step 5: Based on the session token, the system looks up the CoT Key for use in Password Generation.

Step 6: At this stage, the system has a "User Key" (from the request), CoT Key (looked up using device Token) and the Organization Key (based on the URL and the organization name in Cert).

Step 7: Based on the organization name, the system backend looks up the password length requirements and list of characters that is allowed by the organization (or the specific URL) for password.

Step 8: The three keys (User, Site, CoT) are combined using a cryptographic operation. The derivative of the combined keys is used to generate a password that matches the length and complexity requirements that were pre-recorded for the organization (or the specific URL).

Step 9: The generated password is sent back to the system plugin and put in the password field.

Password Generation Process Using Targeted Application

Figure 11:
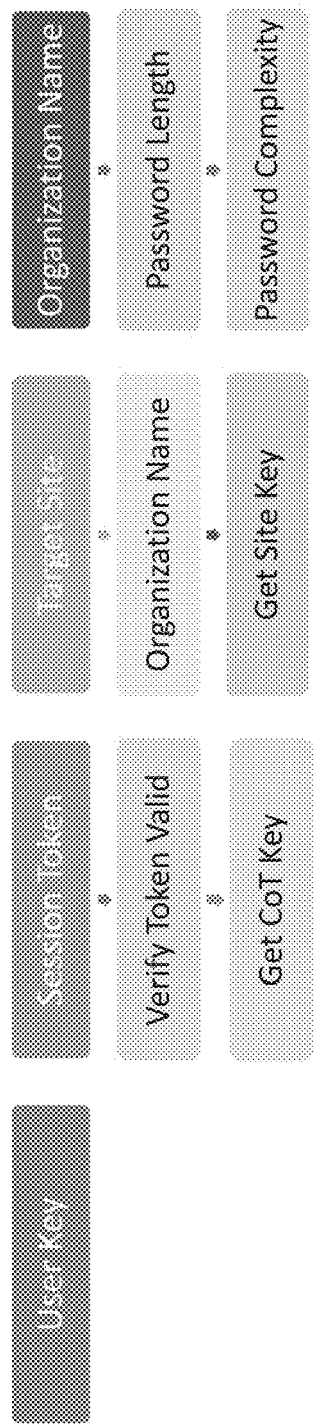
FIGS. 11-13 illustrates steps for password generation.
Figure 12:
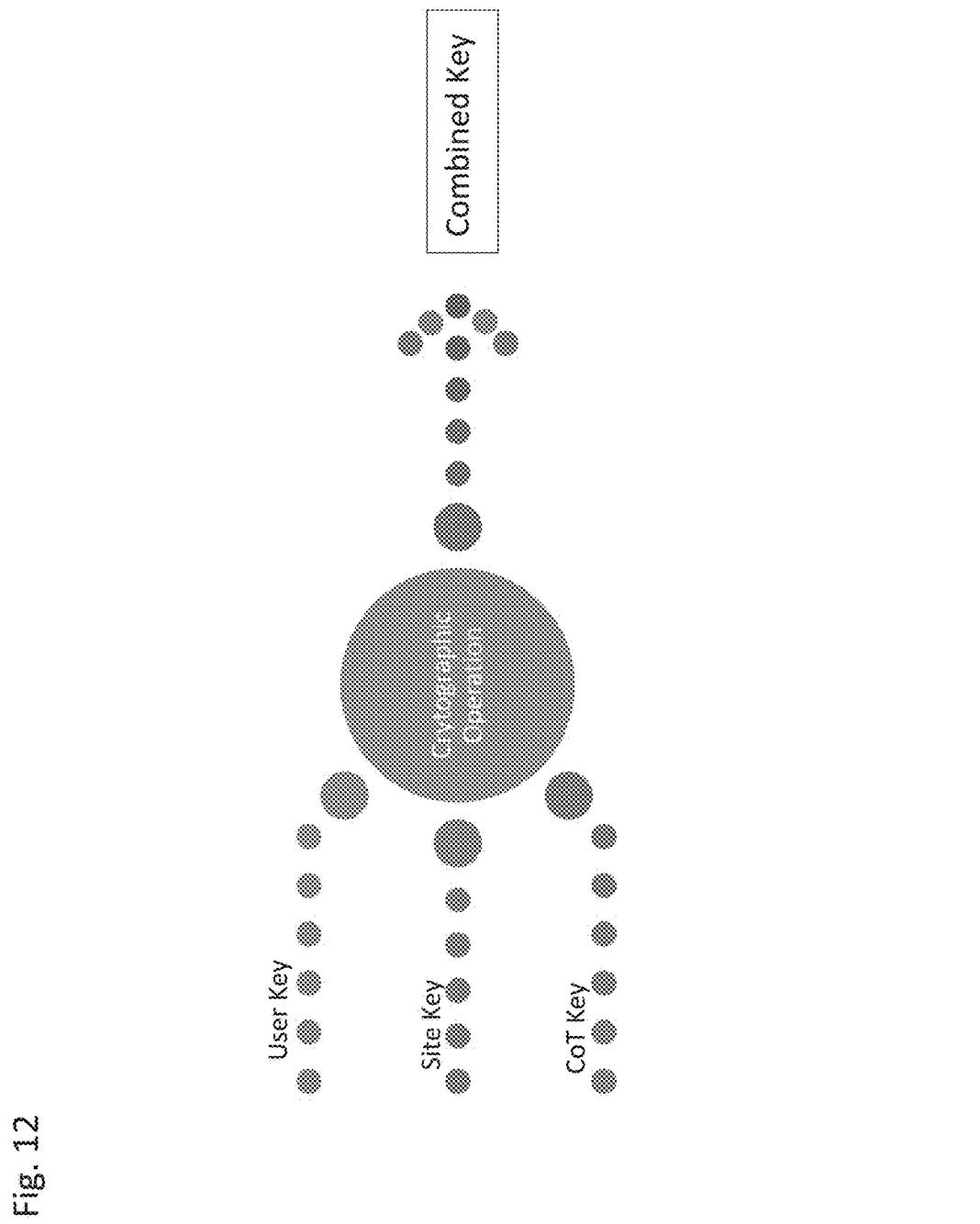
Figure 13:
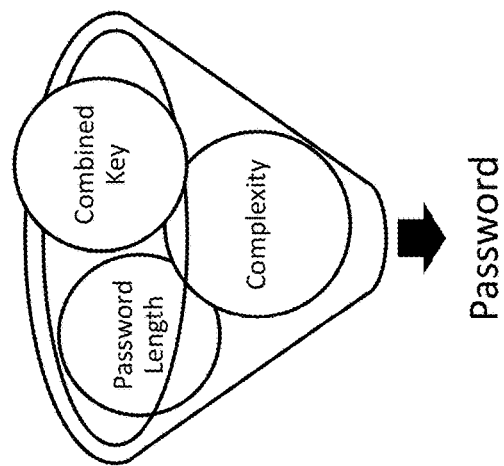

Password generation can be performed as a multi-step process using multiple factors, as illustrated in FIGS. 11-13.

Step 1: The user selects a "secret" using the system application.

Step 2: The secret is converted to a "User Key" using a strong Key Derivation Function. The Salt that is placed on the device is used for Key Derivation. This makes it very hard to precompute the User Key.

Step 3: The user selects the targeted site, application name or name of organization that he/she is trying to authenticate to. The user is displayed the list of options in an easy to find type-ahead search system. Once the user selects the target, it is stored for future use.

Step 4: The User Key (from step 2) with the stored Session Token are sent to the system backend. The target selected by the user in Step 3 is also made part of this request.

Step 5: The system backend receives the password generation request. The request contains the target site that the user is trying to log into. In this case, the system looks up the Site Key associated with the target site (or generate one if needed).

Step 6: Based on the session token, the system looks up the CoT Key that is used for Password Generation.

Step 7: At this stage, the system has a "User Key" (from the request), CoT Key (looked up using device Token) and the Site Key (based on the URL and the organization name in Cert).

Step 8: Based on the organization name, the system backend looks up the password length requirements and list of characters that are allowed by the organization (or the specific URL) for password.

Step 9: The three keys (User, Site, CoT) are combined using a cryptographic operation. The derivative of the combined keys is used to generate a password that matches the length and complexity requirements that were pre-recorded for the organization (or the specific URL).

Step 10: The generated password is sent back to the system plugin and put in the password field.

Security Advantages

Tailored Passwords

One advantage of the system is that it generates password that is tailored to the password policy of the web site that the user is using. Password policies for websites across the Internet very inconsistent and there is no standard policy. For example, the minimum and maximum password length requirements vary significantly across the sites. Very often, sites limit the set of special characters that can be used by the users. This often causes users to use the "least common denominator". These passwords are therefore created with best chance to be accepted by the site and this comes at a significant security compromise. It is therefore no surprise that passwords are like "12345", "password" and "qwerty" are so commonly used.

With the system, the passwords are generated to meet the security policy of the website while being cryptographically strong. They are tailored because they are created to be a best fit and unique for the CoT. Passwords generated by the system can be unique to the CoT. This makes it impossible for anyone else to generate the same password.

The system creates the most complex password that a site can support. Because the password is generated to meet the most stringent security requirements of the site, it will be accepted by the website while providing the highest level of security. For example, if a website supports a password with minimum length of 8, maximum length of 20 with special characters limited to ! @ # $ ^ & * ( ), the system will create a password is that one of the most complex combinations of these 20 characters. To put this in perspective, there are $1.4016834e+37$ combinations possible.

Unique Passwords

The system automatically generates a unique and secure password for the site. The secret does not need to change across the sties. Because the password is unique to the site, the accounts are secure even if the passwords at one site are compromised. With the system, it is not possible to reuse a compromised password hash. It is computationally expensive or impractical to crack these passwords. Even if a password can be accessed in clear text from the compromised site, the compromised password cannot be reused on any other website as there is no way for anyone to derive the secret from the password. The system therefore severely limits the impact to accounts even in the case of a compromise to specific sites or accounts.

No Storage of Passwords

A traditional weakness with most password managers is that they store the passwords in multiple places for backups, sync, caching etc. These passwords, while stored using strong cryptography, have the risk to be compromised when the service is compromised. The system is a password generation service and it never stores the passwords in any (hashed, encrypted, encoded, or clear text) format. This therefore severely limits the risk of a compromise even if the system backend was to get compromised.

Phishing Protection

The system protects against the most common phishing attack that targets compromise of security credentials. A phishing site is different from real site in many ways. While it may "look" the same to humans, it is natural for computers and for the system to see that the phishing site and real site are different. The system uses this key principle to generate unique password for every site. So even if the end user falls for a phishing email and ends up generating the password, the password generated by the system will be completely useless on any real site. The attacker can therefore not use those credentials in any way. The system will therefore protect the user against the most common phishing attack.

Rate Limiting (Brute Force Prevention)

The system generates passwords for the user in real-time using multiple different factors, as described herein. This allows the system to rate limit the number of password generation attempts. This ability makes it seamless for the end user to generate passwords as often as the user needs for valid use cases. However, if an attacker was trying to launch a brute-force attack on any account, that will be severely limited. This is because the system automatically limits the number of passwords generations that can be done every minute. This limit can be adjusted based on the risk profile of the system and/or CoT. Factors such as the geo-location, system profile, past usage patterns can be incorporated to determine a risk profile. This rate limiting and brute force prevention is an added protection to any existing brute force protection mechanism that the site may already have in place. The net impact prohibits the attacker from attempting a large number of password generation attempts on a compromised device.

Inherently Multi Factor

The biggest weakness of password based authentication systems is the ability to guess or brute-force passwords. Passwords are relatively easy to guess for many users and commonly reused. The combination allows the hackers to obtain passwords from compromised sites and use them against other sites, thereby taking over an account.

The most common way to mitigate this risk is to enforce multi (two or more) factor authentication. The two commonly used factors are something that you know (e.g., password) and something that you have (e.g., phone). The one factor that remains constant is the password that the hacker may be able to guess or brute force. However, the second factor, in most common use cases is a phone. A one-time token is pushed/generated on the phone that serves as a second factor. When the user provides both the password and the one-time token, the user will be able to log in the site. This prevents account takeover by hacker through compromised passwords. The hackers will not have access to the phone and therefore will not be able to provide the one-time token.

Passwords that are generated by the system require a combination of something you know (the system secret) and something you have (a trusted device). Even if someone is able to guess user's secret, that is useless by itself. The user's secret is a cryptographic input to the Trusted Device. The attacker will not have access to a user's phone or laptop and therefore cannot even attempt to start guessing the secret. This makes the system generated passwords multi-factored.

According to an embodiment of the invention, the system for generating a password includes a non-transitory computer readable medium having instructions that, when executed, cause one or more processors to perform the following steps: receive an input from a user, the input comprising a secret natural language phrase to be used as an initial password generation phrase, wherein the secret natural language phrase is an arbitrary phrase provided by the user; query a search repository using the natural language phrase as a subject to the search repository to generate query results; receive query results and parse the query results to identify a subset of query results based on the initial password generation phrase; present the identified subset of query results to the user as an ordered list of suggested password phrases; receive a selection of one password phrase of the suggested password phrases from the presented subset; generate a password based on the selected password phrase by transforming the selected password phrase into a secure passphrase using a deterministic process; and provide the secure passphrase to an application as an account password for the user.

As used herein, a secret is information that is intended to be hidden from certain individuals or groups who do not have the "need to know", perhaps while sharing it with other individuals. As used herein, a natural language phrase can be derived from a language that has developed naturally in use (as contrasted with an artificial language or computer code).

In an alternative or additional embodiment, the ordered list of suggested password phrases is ordered based on stored information relating to a context provided by the user, wherein the context is selected from one of "book", "movie", "location", "music", or "color". In an alternative or additional embodiment, the one or more processors is further configured to perform: access a store of spelling corrections for words that may be entered by a user as the secret natural language phrase; correct the spelling of the secret natural language phrase; and calculate at least one of the ordered list of suggested password phrases based on the corrected spelling of the secret natural language phrase.

In an alternative or additional embodiment, the input received from the user is by an alphanumeric input or voice input. In an alternative or additional embodiment, the one or more processors is further configured to perform: identify a context type based on the initial password generation phrase received from the user by executing a query of the initial password generation phrase in a search repository of natural language terms, wherein the context type is selected from a dictionary of natural language terms; and select the search repository based on the identified context type.

In an alternative or additional embodiment, the one or more processors is further configured to perform: if the system is unable to identify a context type based on the initial password generation phrase, then prompt the user to select the context type from a plurality of possible context types. In an alternative or additional embodiment, the one or more processors is further configured to perform identify a context type based on the number of query results from a context in the search repository based on the password generation phrase.

In an alternative or additional embodiment, the secure passphrase has an entropy of at least a specified minimum value, wherein the entropy is a measurement of how unpredictable the secure passphrase is. In an alternative or additional embodiment, the one or more processors is further configured to perform: execute a risk analysis of an environment in which the user is operating; based on the risk analysis, perform a fuzzy matching transformation of the natural language phrase to a secure passphrase, wherein the fuzzy matching based on the risk analysis.

In an alternative or additional embodiment, the transformation of the selected password phrase into the password is based on a risk level associated with a device from which the initial password generation phrase is provided. In an alternative or additional embodiment, the one or more processors is further configured to perform: transform the secret natural language phrase into multiple secure passphrases based on a trust level such that correspondingly more passwords are generated in higher trust environment.

In an alternative or additional embodiment, the one or more processors is further configured to perform: assess the trust of a user environment based on one of a token, internet protocol address, or device fingerprint; and provide a suggestion to the user from the ordered list of suggested password phrases based on the trust level.

In an alternative or additional embodiment, the one or more processors is further configured to use a site key to generate multiple passwords. In an alternative or additional embodiment, the one or more processors is further configured to perform: operate a password manager service; verify a certificate associated with an Internet site that is prompting for a password; and identify the organization name in the certificate. In an alternative or additional embodiment, the one or more processors is further configured to perform: generate a secure passphrase in compliance with parameters set by a password policy of a website, wherein the compliance parameters relate to one or more of length or complexity.

The Computerized System

Figure 6:
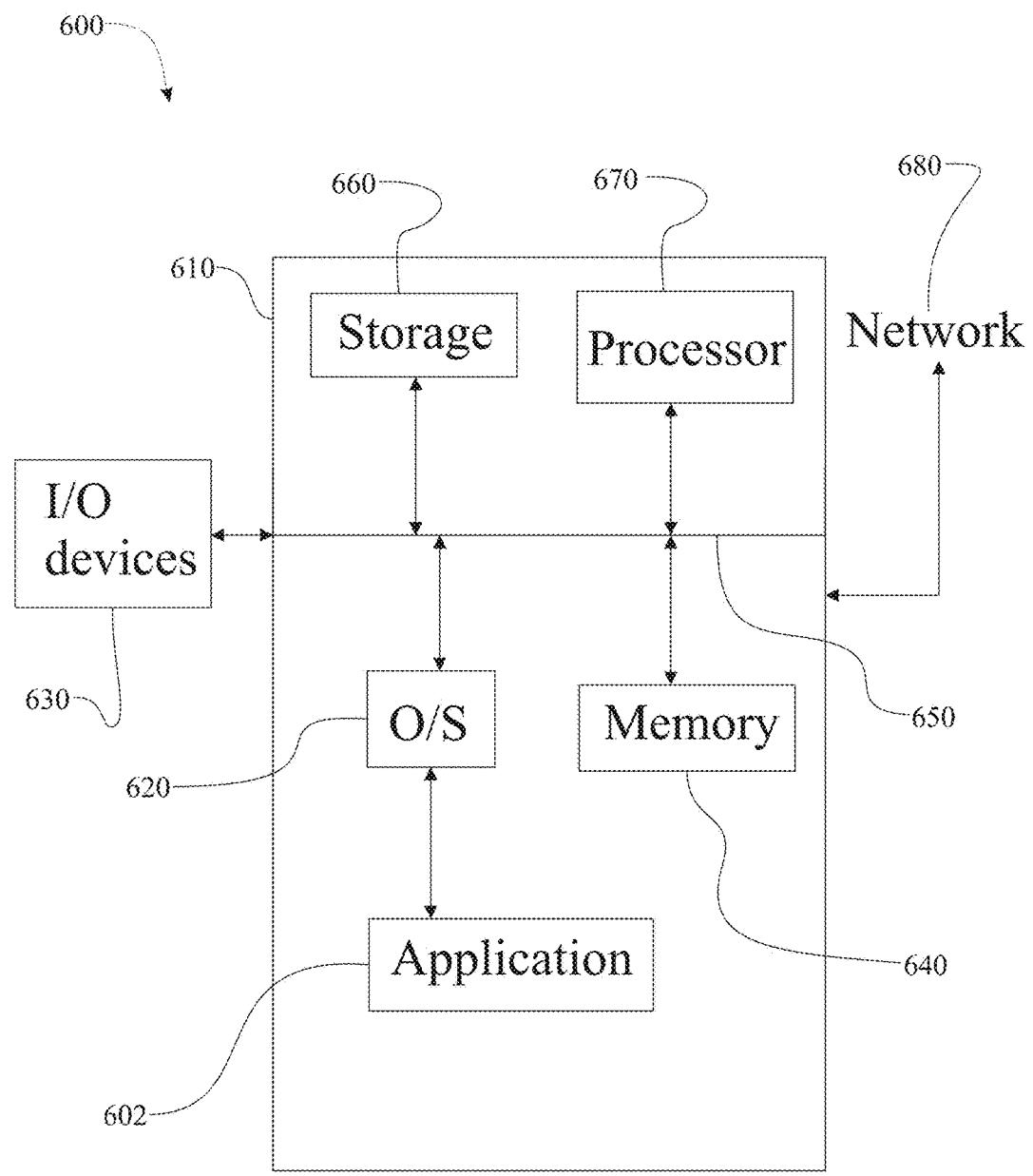
FIG. 6 illustrates an example of a computer system for implementing the invention.

With reference to FIG. 6, a computerized system 600 is depicted as an example computerized system on which the invention may be implemented. The computerized system 600 depicts a computer system 610 that comprises a storage 660, a processor 670, a memory 640, and an operating system 620. The storage 660, processor 670, memory 640, and operating system 620 may be communicatively coupled over a communication infrastructure 650. Optionally, the computer system 610 may interact with a user via I/O devices 630, as well as a network 680, via the communication infrastructure 650. The operating system 620 may interact with other components to control application 602.

The systems and methods described herein can be implemented in software or hardware or any combination thereof. The systems and methods described herein can be implemented using one or more computing devices which may or may not be physically or logically separate from each other. The methods may be performed by components arranged as either on-premise hardware, on-premise virtual systems, or hosted-private instances. Additionally, various aspects of the methods described herein may be combined or merged into other functions.

An example computerized system for implementing the invention is illustrated in FIG. 6. A processor or computer system can be configured to particularly perform some or all of the method described herein. In some embodiments, the method can be partially or fully automated by one or more computers or processors. The invention may be implemented using a combination of any of hardware, firmware and/or software. The present invention (or any part(s) or function(s) thereof) may be implemented using hardware, software, firmware, or a combination thereof and may be implemented in one or more computer systems or other processing systems. In some embodiments, the illustrated system elements could be combined into a single hardware device or separated into multiple hardware devices. If multiple hardware devices are used, the hardware devices could be physically located proximate to or remotely from each other. The embodiments of the methods described and illustrated are intended to be illustrative and not to be limiting. For example, some or all of the steps of the methods can be combined, rearranged, and/or omitted in different embodiments.

In one exemplary embodiment, the invention may be directed toward one or more computer systems capable of carrying out the functionality described herein. Example computing devices may be, but are not limited to, a personal computer (PC) system running any operating system such as, but not limited to, Microsoft™ Windows™. However, the invention may not be limited to these platforms. Instead, the invention may be implemented on any appropriate computer system running any appropriate operating system. Other components of the invention, such as, but not limited to, a computing device, a communications device, mobile phone, a telephony device, a telephone, a personal digital assistant (PDA), a personal computer (PC), a handheld PC, an interactive television (iTV), a digital video recorder (DVD), client workstations, thin clients, thick clients, proxy servers, network communication servers, remote access devices, client computers, server computers, routers, web servers, data, media, audio, video, telephony or streaming technology servers, etc., may also be implemented using a computing device. Services may be provided on demand using, e.g., but not limited to, an interactive television (iTV), a video on demand system (VOD), and via a digital video recorder (DVR), or other on demand viewing system.

The system may include one or more processors. The processor(s) may be connected to a communication infrastructure, such as but not limited to, a communications bus, cross-over bar, or network, etc. The processes and processors need not be located at the same physical locations. In other words, processes can be executed at one or more geographically distant processors, over for example, a LAN or WAN connection. Computing devices may include a display interface that may forward graphics, text, and other data from the communication infrastructure for display on a display unit.

The computer system may also include, but is not limited to, a main memory, random access memory (RAM), and a secondary memory, etc. The secondary memory may include, for example, a hard disk drive and/or a removable storage drive, such as a compact disk drive CD-ROM, etc. The removable storage drive may read from and/or write to a removable storage unit. As may be appreciated, the removable storage unit may include a computer usable storage medium having stored therein computer software and/or data. In some embodiments, a machine-accessible medium may refer to any storage device used for storing data accessible by a computer. Examples of a machine-accessible medium may include, e.g., but not limited to: a magnetic hard disk; a floppy disk; an optical disk, like a compact disk read-only memory (CD-ROM) or a digital versatile disk (DVD); a magnetic tape; and/or a memory chip, etc.

The processor may also include, or be operatively coupled to communicate with, one or more data storage devices for storing data. Such data storage devices can include, as non-limiting examples, magnetic disks (including internal hard disks and removable disks), magneto-optical disks, optical disks, read-only memory, random access memory, and/or flash storage. Storage devices suitable for tangibly embodying computer program instructions and data can also include all forms of non-volatile memory, including, for example, semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

The processing system can be in communication with a computerized data storage system. The data storage system can include a non-relational or relational data store, such as a MySQL™ or other relational database. Other physical and logical database types could be used. The data store may be a database server, such as Microsoft SQL Server™, Oracle™, IBM DB2™, SQLITE™, or any other database software, relational or otherwise. The data store may store the information identifying syntactical tags and any information required to operate on syntactical tags. In some embodiments, the processing system may use object-oriented programming and may store data in objects. In these embodiments, the processing system may use an object-relational mapper (ORM) to store the data objects in a relational database. The systems and methods described herein can be implemented using any number of physical data models. In one example embodiment, an RDBMS can be used. In those embodiments, tables in the RDBMS can include columns that represent coordinates. In the case of economic systems, data representing companies, products, etc. can be stored in tables in the RDBMS. The tables can have pre-defined relationships between them. The tables can also have adjuncts associated with the coordinates.

In alternative exemplary embodiments, secondary memory may include other similar devices for allowing computer programs or other instructions to be loaded into computer system. Such devices may include, for example, a removable storage unit and an interface. Examples of such may include a program cartridge and cartridge interface (such as, e.g., but not limited to, those found in video game devices), a removable memory chip (such as, e.g., but not limited to, an erasable programmable read only memory (EPROM), or programmable read only memory (PROM) and associated socket, and other removable storage units and interfaces, which may allow software and data to be transferred from the removable storage unit to computer system.

The computing device may also include an input device such as but not limited to, a mouse or other pointing device such as a digitizer, and a keyboard or other data entry device (not shown). The computing device may also include output devices, such as but not limited to, a display, and a display interface. Computer may include input/output (I/O) devices such as but not limited to a communications interface, cable and communications path, etc. These devices may include, but are not limited to, a network interface card, and modems. Communications interface may allow software and data to be transferred between computer system and external devices.

In one or more embodiments, the present embodiments are practiced in the environment of a computer network or networks. The network can include a private network, or a public network (for example the Internet, as described below), or a combination of both. The network includes hardware, software, or a combination of both.

From a telecommunications-oriented view, the network can be described as a set of hardware nodes interconnected by a communications facility, with one or more processes (hardware, software, or a combination thereof) functioning at each such node. The processes can inter-communicate and exchange information with one another via communication pathways between them using interprocess communication pathways. On these pathways, appropriate communications protocols are used.

An exemplary computer and/or telecommunications network environment in accordance with the present embodiments may include node, which include may hardware, software, or a combination of hardware and software. The nodes may be interconnected via a communications network. Each node may include one or more processes, executable by processors incorporated into the nodes. A single process may be run by multiple processors, or multiple processes may be run by a single processor, for example. Additionally, each of the nodes may provide an interface point between network and the outside world, and may incorporate a collection of sub-networks.

In an exemplary embodiment, the processes may communicate with one another through interprocess communication pathways supporting communication through any communications protocol. The pathways may function in sequence or in parallel, continuously or intermittently. The pathways can use any of the communications standards, protocols or technologies, described herein with respect to a communications network, in addition to standard parallel instruction sets used by many computers.

The nodes may include any entities capable of performing processing functions. Examples of such nodes that can be used with the embodiments include computers (such as personal computers, workstations, servers, or mainframes), handheld wireless devices and wireline devices (such as personal digital assistants (PDAs), modem cell phones with processing capability, wireless email devices including Blackberry™ devices), document processing devices (such as scanners, printers, facsimile machines, or multifunction document machines), or complex entities (such as local-area networks or wide area networks) to which are connected a collection of processors, as described. For example, in the context of the present invention, a node itself can be a wide-area network (WAN), a local-area network (LAN), a private network (such as a Virtual Private Network (VPN)), or collection of networks.

Communications between the nodes may be made possible by a communications network. A node may be connected either continuously or intermittently with communications network. As an example, in the context of the present invention, a communications network can be a digital communications infrastructure providing adequate bandwidth and information security.

The communications network can include wireline communications capability, wireless communications capability, or a combination of both, at any frequencies, using any type of standard, protocol or technology. In addition, in the present embodiments, the communications network can be a private network (for example, a VPN) or a public network (for example, the Internet).

A non-inclusive list of exemplary wireless protocols and technologies used by a communications network may include BlueTooth™, general packet radio service (GPRS), cellular digital packet data (CDPD), mobile solutions platform (MSP), multimedia messaging (MMS), wireless application protocol (WAP), code division multiple access (CDMA), short message service (SMS), wireless markup language (WML), handheld device markup language (HDML), binary runtime environment for wireless (BREW), radio access network (RAN), and packet switched core networks (PS-CN). Also included are various generation wireless technologies. An exemplary non-inclusive list of primarily wireline protocols and technologies used by a communications network includes asynchronous transfer mode (ATM), enhanced interior gateway routing protocol (EIGRP), frame relay (FR), high-level data link control (HDLC), Internet control message protocol (ICMP), interior gateway routing protocol (IGRP), internetwork packet exchange (IPX), ISDN, point-to-point protocol (PPP), transmission control protocol/internet protocol (TCP/IP), routing information protocol (RIP) and user datagram protocol (UDP). As skilled persons will recognize, any other known or anticipated wireless or wireline protocols and technologies can be used.

Embodiments of the present invention may include apparatuses for performing the operations herein. An apparatus may be specially constructed for the desired purposes, or it may comprise a general purpose device selectively activated or reconfigured by a program stored in the device.

In one or more embodiments, the present embodiments are embodied in machine-executable instructions. The instructions can be used to cause a processing device, for example a general-purpose or special-purpose processor, which is programmed with the instructions, to perform the steps of the present invention. Alternatively, the steps of the present invention can be performed by specific hardware components that contain hardwired logic for performing the steps, or by any combination of programmed computer components and custom hardware components. For example, the present invention can be provided as a computer program product, as outlined above. In this environment, the embodiments can include a machine-readable medium having instructions stored on it. The instructions can be used to program any processor or processors (or other electronic devices) to perform a process or method according to the present exemplary embodiments. In addition, the present invention can also be downloaded and stored on a computer program product. Here, the program can be transferred from a remote computer (e.g., a server) to a requesting computer (e.g., a client) by way of data signals embodied in a carrier wave or other propagation medium via a communication link (e.g., a modem or network connection) and ultimately such signals may be stored on the computer systems for subsequent execution).

The methods can be implemented in a computer program product accessible from a computer-usable or computer-readable storage medium that provides program code for use by or in connection with a computer or any instruction execution system. A computer-usable or computer-readable storage medium can be any apparatus that can contain or store the program for use by or in connection with the computer or instruction execution system, apparatus, or device.

A data processing system suitable for storing and/or executing the corresponding program code can include at least one processor coupled directly or indirectly to computerized data storage devices such as memory elements. Input/output (I/O) devices (including but not limited to keyboards, displays, pointing devices, etc.) can be coupled to the system. Network adapters may also be coupled to the system to enable the data processing system to become coupled to other data processing systems or remote printers or storage devices through intervening private or public networks. To provide for interaction with a user, the features can be implemented on a computer with a display device, such as an LCD (liquid crystal display), or another type of monitor for displaying information to the user, and a keyboard and an input device, such as a mouse or trackball by which the user can provide input to the computer.

A computer program can be a set of instructions that can be used, directly or indirectly, in a computer. The systems and methods described herein can be implemented using programming languages such as Flash™, JAVA™, C++, C, C#, Python, Visual Basic™, JavaScript™ PHP, XML, HTML, etc., or a combination of programming languages, including compiled or interpreted languages, and can be deployed in any form, including as a stand-alone program or as a module, component, subroutine, or other unit suitable for use in a computing environment. The software can include, but is not limited to, firmware, resident software, microcode, etc. Protocols such as SOAP/HTTP may be used in implementing interfaces between programming modules. The components and functionality described herein may be implemented on any desktop operating system executing in a virtualized or non-virtualized environment, using any programming language suitable for software development, including, but not limited to, different versions of Microsoft Windows™, Apple™ Mac™, iOS™, Unix™/X-Windows™, Linux™ etc. The system could be implemented using a web application framework, such as Ruby on Rails.

Suitable processors for the execution of a program of instructions include, but are not limited to, general and special purpose microprocessors, and the sole processor or one of multiple processors or cores, of any kind of computer. A processor may receive and store instructions and data from a computerized data storage device such as a read-only memory, a random access memory, both, or any combination of the data storage devices described herein. A processor may include any processing circuitry or control circuitry operative to control the operations and performance of an electronic device.

The systems, modules, and methods described herein can be implemented using any combination of software or hardware elements. The systems, modules, and methods described herein can be implemented using one or more virtual machines operating alone or in combination with one other. Any applicable virtualization solution can be used for encapsulating a physical computing machine platform into a virtual machine that is executed under the control of virtualization software running on a hardware computing platform or host. The virtual machine can have both virtual system hardware and guest operating system software.

The systems and methods described herein can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks that form the Internet.

One or more embodiments of the invention may be practiced with other computer system configurations, including hand-held devices, microprocessor systems, microprocessor-based or programmable consumer electronics, minicomputers, mainframe computers, etc. The invention may also be practiced in distributed computing environments where tasks are performed by remote processing devices that are linked through a network.

The terms "computer program medium" and "computer readable medium" may be used to generally refer to media such as but not limited to removable storage drive, a hard disk installed in hard disk drive. These computer program products may provide software to computer system. The invention may be directed to such computer program products.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

In the description and claims, the terms "coupled" and "connected," along with their derivatives, may be used. It should be understood that these terms may be not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm may be here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, it may be appreciated that throughout the specification terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. The terms "system" and "method" are used herein interchangeably insofar as the system may embody one or more methods and the methods may be considered as a system.

While one or more embodiments of the invention have been described, various alterations, additions, permutations and equivalents thereof are included within the scope of the invention.

In the description of embodiments, reference is made to the accompanying drawings that form a part hereof, which show by way of illustration specific embodiments of the claimed subject matter. It is to be understood that other embodiments may be used and that changes or alterations, such as structural changes, may be made. Such embodiments, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other embodiments using alternative orderings of the computations could be readily implemented. In addition to being reordered, the computations could also be decomposed into sub-computations with the same results.

What is claimed is:

1. A system for generating a password including one or more processors and a non-transitory computer readable medium having instructions that, when executed, cause the one or more processors to perform the following steps:

receive an input from a user, the input comprising a secret natural language word phrase to be used as an initial password generation phrase to be input to a query engine, wherein the secret natural language word phrase is an arbitrary word phrase provided by the user;

identify a context type based on the secret natural language word phrase received from the user by executing a query of the secret natural language word phrase at the query engine in a search repository of natural language terms;

select the search repository based on the identified context type;

receive the secret natural language word phrase at the query engine, and execute a query at a search repository using the natural language word phrase as a subject to the search repository to generate a candidate password query results;

receive the candidate password query results and parse the password candidate query results to identify a subset of the password candidate query results, wherein the subset is identified based on a pre-determined number of results or a context or a location;

present the identified subset of query results to the user as an ordered list of suggested password phrases;

receive a selection of one password phrase of the suggested password phrases from the presented subset;

generate a password based on the selected password phrase by transforming the selected password phrase into a secure passphrase using a deterministic process; and provide the secure passphrase to an application as an account password for the user.

2. The system of claim 1, wherein the ordered list of suggested password phrases is ordered based on stored information relating to a context provided by the user, wherein the context is selected from one of "book", "movie", "location", "music", or "color".

3. The system of claim 1, wherein the one or more processors is further configured to perform:

access a store of spelling corrections for words that may be entered by a user as the secret natural language word phrase;

correct the spelling of the secret natural language word phrase; and calculate at least one of the ordered list of suggested password phrases based on the corrected spelling of the secret natural language word phrase.

4. The system of claim 1, wherein the input received from the user is by an alphanumeric input or voice input.

5. The system of claim 1, wherein the context type is selected from a dictionary of natural language terms.

6. The system of claim 5, wherein the one or more processors is further configured to perform:

if the system is unable to identify a context type based on the secret natural language word phrase, then prompt the user to select the context type from a plurality of possible context types.

7. The system of claim 1, wherein the one or more processors is further configured to perform: identify a context type based on the number of query results from a context in the search repository based on the secret natural language word phrase.

8. The system of claim 1, wherein the secure passphrase has an entropy of at least a specified minimum value, wherein the entropy is a measurement of how unpredictable the secure passphrase is.

9. The system of claim 1, wherein the one or more processors is further configured to perform:
   execute a risk analysis of an environment in which the user is operating;
   based on the risk analysis, execute a fuzzy matching transformation of the secret natural language word phrase to a secure passphrase, wherein the fuzzy matching based on the risk analysis.

10. The system of claim 1, wherein the transformation of the selected password phrase into the password is based on a risk level associated with a device from which the secret natural language word phrase is provided.

11. The system of claim 1, wherein the one or more processors is further configured to perform:
   transform the secret natural language word phrase into multiple secure passphrases based on (a) a set of pseudorandom characters and (b) a trust level, such that correspondingly more passwords are generated in higher trust environment.

12. The system of claim 1, wherein the one or more processors is further configured to perform:
   assess the trust of a user environment based on one of a token, internet protocol address, or device fingerprint; and
   provide a suggestion to the user from the ordered list of suggested password phrases based on the trust level.

13. The system of claim 1, wherein the one or more processors is further configured to use a site key to generate multiple passwords.

14. The system of claim 1, wherein the one or more processors is further configured to perform:
   operate a password manager service;
   verify a certificate associated with an Internet site that is prompting for a password; and
   identify the organization name in the certificate.

15. The system of claim 1, wherein the one or more processors is further configured to perform:
   generate a secure passphrase in compliance with parameters set by a password policy of a website, wherein the compliance parameters relate to one or more of length or complexity.

16. A method implemented in a computer system for generating a password, the method comprising:
   receiving an input from a user, the input comprising a secret natural language word phrase to be used as an initial password generation phrase to be input to a query engine, wherein the secret natural language word phrase is an arbitrary word phrase provided by the user;
   identifying a context type based on the secret natural language word phrase received from the user by executing a query of the secret natural language word phrase at the query engine in a search repository of natural language terms;
   selecting the search repository based on the identified context type;
   receiving the secret natural language word phrase at the query engine, and executing a query at a search repository using the natural language word phrase as a subject to the search repository to generate a candidate password query results;
   receiving the candidate password query results and parsing the password candidate query results to identify a subset of the password candidate query results, wherein the subset is identified based on a pre-determined number of results or a context or a location;
   presenting the identified subset of query results to the user as an ordered list of suggested password phrases;
   receiving a selection of one password phrase of the suggested password phrases from the presented subset;
   generating a password based on the selected password phrase by transforming the selected password phrase into a secure passphrase using a deterministic process; and
   providing the secure passphrase to an application as an account password for the user.

17. The method of claim 16, wherein the ordered list of suggested password phrases is ordered based on stored information relating to a context provided by the user, wherein the context is selected from one of "book", "movie", "location", "music", or "color".

18. The method of claim 16, wherein the method is further configured to comprise:
   accessing a store of spelling corrections for words that may be entered by a user as the secret natural language word phrase;
   correcting the spelling of the secret natural language word phrase; and
   calculating at least one of the ordered list of suggested password phrases based on the corrected spelling of the secret natural language word phrase.

19. The method of claim 16, wherein the input received from the user is by an alphanumeric input or voice input.

20. The method of claim 16, wherein the context type is selected from a dictionary of natural language terms.

* * * * *